UNITED STATES PATENT OFFICE.

JOSEPH A. SEWALL, OF BOULDER, COLORADO, ASSIGNOR OF TWO-THIRDS TO W. H. STENNETT, OF CHICAGO, ILLINOIS.

VETERINARY REMEDY.

SPECIFICATION forming part of Letters Patent No. 358,001, dated February 15, 1887.

Application filed November 5, 1886. Serial No. 218,086. (Specimens.)

*To all whom it may concern:*

Be it known that I, JOSEPH A. SEWALL, of Boulder, in the county of Boulder and State of Colorado, have invented a Medicine or Remedy for Hogs, Horses, Cattle, Sheep, Fowls, &c., of which the following is a specification.

My invention is intended for the treatment of all diseases to which swine, cattle, horses, mules, sheep, and fowls are subject, and which are caused by or dependent upon bacteria, microbes, bacillus, vibrios, micrococci, monads, or other germs in the blood or other vital fluids of said animals, and for all diseases in said animals that are dependent upon blood poisoning. Among such diseases are the following—that is to say, hog-cholera, swine-pest, pig distemper, blue sickness, blue disease, purples, red soltheria, anthrax fever, bristle fever, epizootic catarrh, pleuro-enteritis, charbon, rinderpest, Texas fever, blood-disease, splenic fever, fowl-cholera, chicken-cholera, henpest, maladie du sang, sang de rate, septicæmia, &c., in all of which my medicine will be found efficacious as a remedy or preventive.

In carrying out my invention I use, by preference, the following ingredients in about the proportions specified—that is to say, biborate of sodium, one thousand parts; boric acid, one hundred parts; iodine, one part. The above ingredients are suitably mixed together.

The medicine is used internally, and is administered with the ordinary food of the animal or fowl to be treated.

I find from experience that the following are about the proper amounts to be administered as a dose: for horses and cattle, about four drams; for hogs, about one dram; for fowls, about ten grains. The dose to be repeated as necessary.

As equivalents of the said ingredients I name borate of soda, biborate of soda, borax, ($Na_2O, 2B_2O_3, 10H_2O$,) borate de soude, borsaure, borsaures natron, boracic acid, and all combinations, compounds, and mixtures of boracic or boric acid and soda or sodium.

Having described my invention, I claim—

As a medicine or remedy, the combination of the following ingredients in about the proportions specified, viz: biborate of sodium, one thousand parts, boric acid, one hundred parts, (or their equivalents, as specified,) and iodine, one part, substantially as set forth.

In testimony whereof I have hereunto set my hand and seal.

JOSEPH A. SEWALL. [L. S.]

Witnesses:
CHAS. L. SPENCER,
ISAAC L. BOND.